United States Patent
Klinglmair et al.

(10) Patent No.: US 10,883,311 B2
(45) Date of Patent: Jan. 5, 2021

(54) COATED SURFACES FOR BEARINGS USED IN DRILLING MOTORS

(71) Applicant: Aktiebolaget SKF, Gothenburg (SE)

(72) Inventors: Erich Klinglmair, Niederneukirchen (AT); Simon Blasl, Losenstein (AT); Parveen K Chandila, Tomball, TX (US)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 15/872,010

(22) Filed: Jan. 16, 2018

(65) Prior Publication Data

US 2019/0218861 A1    Jul. 18, 2019

(51) Int. Cl.
| | |
|---|---|
| *E21B 4/00* | (2006.01) |
| *F16C 33/58* | (2006.01) |
| *E21B 10/23* | (2006.01) |
| *E21B 10/22* | (2006.01) |
| *E21B 10/24* | (2006.01) |
| *F16C 33/62* | (2006.01) |
| *F16C 19/14* | (2006.01) |
| *E21B 10/00* | (2006.01) |

(52) U.S. Cl.
CPC .............. *E21B 4/003* (2013.01); *E21B 10/22* (2013.01); *E21B 10/23* (2013.01); *E21B 10/24* (2013.01); *F16C 33/585* (2013.01); *F16C 33/62* (2013.01); *E21B 10/00* (2013.01); *F16C 19/14* (2013.01); *F16C 2202/04* (2013.01); *F16C 2206/56* (2013.01); *F16C 2206/82* (2013.01); *F16C 2223/60* (2013.01); *F16C 2240/64* (2013.01); *F16C 2240/90* (2013.01); *F16C 2352/00* (2013.01)

(58) Field of Classification Search
CPC .......... E21B 4/003; E21B 10/22; E21B 10/00; E21B 10/23; E21B 10/24; E21B 10/243; F16C 33/445; F16C 2223/30
See application file for complete search history.

(56) References Cited

U.S. PATENT DOCUMENTS

| | | | | |
|---|---|---|---|---|
| 2012/0091396 A1* | 4/2012 | Setlur | ................... | B82Y 30/00 252/387 |
| 2013/0098688 A1* | 4/2013 | Yong | ...................... | E21B 10/22 175/227 |
| 2014/0326514 A1* | 11/2014 | Lin | ......................... | E21B 10/25 175/327 |
| 2015/0322719 A1* | 11/2015 | Sue | ........................ | C23C 4/06 175/92 |
| 2017/0045087 A1* | 2/2017 | Schweitzer | ......... | F16C 33/6659 |

* cited by examiner

*Primary Examiner* — Tara Schimpf
(74) *Attorney, Agent, or Firm* — Garcia-Zamor Intellectual Property Law; Ruy Garcia-Zamor; Bryan Peckjian

(57) ABSTRACT

A bearing providing a plurality of rolling elements and at least one raceway for the rolling elements. The at least one raceway or the rolling elements include a tungsten carbide coating. In some embodiments, the tungsten carbide coating may be a Nano-structured tungsten carbide coating. In some embodiments, the at least one raceway or the rolling elements may comprise a steel substrate covered with the tungsten carbide coating. Embodiments also relate to a method for producing a bearing. The method includes coating a plurality of rolling elements or at least one raceway for the rolling elements with a tungsten carbide coating. In some embodiments, the tungsten carbide coating may be a Nano-structured tungsten carbide coating.

11 Claims, 3 Drawing Sheets

COATED SURFACES FOR BEARINGS USED IN DRILLING MOTORS

TECHNOLOGICAL FIELD

The present disclosure relates to bearings and bearing assemblies, particularly bearings used in highly abrasive or corrosive environments, such as in drilling motors.

BACKGROUND

In downhole drilling, mud lubricated motor bearings are directly exposed to the drilling fluid, which is a mixture of water and chemicals (including some solids). The drilling fluid acts as a lubricant to the motor bearings when passing directly through them.

The solid particles in the drilling fluid act as abrasives and wear down the balls and race-ways. Besides the solids, the fluid may contain chemically aggressive substances which also attack the bearing components. This results in a combination of corrosion and wear on the bearing and associated rings or raceways which lead to accelerated wear in conventional steel bearings.

Bearing service life may be defined by the amount of wear on the single rings which results in an increase of the axial clearance in the bearing assembly. As the corrosion and abrasion accumulate, the ring is worn down, increasing the tolerance beyond those which were originally designed. Due to the wear on the bearing assembly, the lifetime of the bearing is limited. Bearing service lives achieved may be hundred or several hundred service hours at most, and it may take two days to get the drilling head out of the ground and a new one back into operation.

Therefore, there is a need for bearings and their associated assemblies to be more resistant to abrasion and corrosion to increase bearing service life.

SUMMARY

Embodiments relate to a bearing comprising a plurality of rolling elements and at least one raceway for the rolling elements. The at least one raceway or the rolling elements comprise a tungsten carbide coating. A tungsten carbide coating may provide increased resistance to abrasion and corrosion, thus increasing bearing service life.

In some embodiments, the tungsten carbide coating of the bearing may be a Nano-structured tungsten carbide coating.

In some embodiments, the at least one raceway or the rolling elements may comprise a steel substrate covered with the tungsten carbide coating.

In some embodiments, the steel substrate may have an operating temperature above 450° C. A sufficiently high operating temperature may allow the steel to resist external influences during the coating process and to maintain its expected strength.

In some embodiments, the tungsten carbide coating may have a thickness between 5 µm to 300 µm. Thus, the coating can be applied to bearings with very small tolerances.

In some embodiments, the bearing comprises a radial or thrust bearing.

In some embodiments, the hardness of the tungsten carbide coated surfaces may be greater than 400 Hv. The greater the hardness of the tungsten carbide coating, the more resistant it can be to the abrasive forces encountered during a drilling operation, thus increasing service life.

Embodiments relate to mud lubricated drilling equipment comprising a drill and a mud lubricated bearing. The mud lubricated bearing comprises a plurality of rolling elements and at least one raceway for the rolling elements. The plurality of rolling elements or the at least one raceway for the rolling elements comprise a tungsten carbide coating. Due to the increased abrasion and corrosion resistance, the mud lubricated drilling equipment may remain in operation for much longer times before requiring service or replacement bearings.

In some embodiments, the tungsten carbide coating of the mud lubricated bearing may be a Nano-structured tungsten carbide coating.

Embodiments relate to a method for producing a bearing. The method comprises coating a plurality of rolling elements or at least one raceway for the rolling elements with a tungsten carbide coating.

In some embodiments, the plurality of rolling elements or at least one raceway for the rolling elements may be coated with a Nano-structured tungsten carbide coating.

In some embodiments, the tungsten carbide may be coated by chemical vapor deposition (CVD).

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Unless otherwise defined, all terms (including technical and scientific terms) are used herein in their ordinary meaning of the art to which the examples belong.

Figure 1:
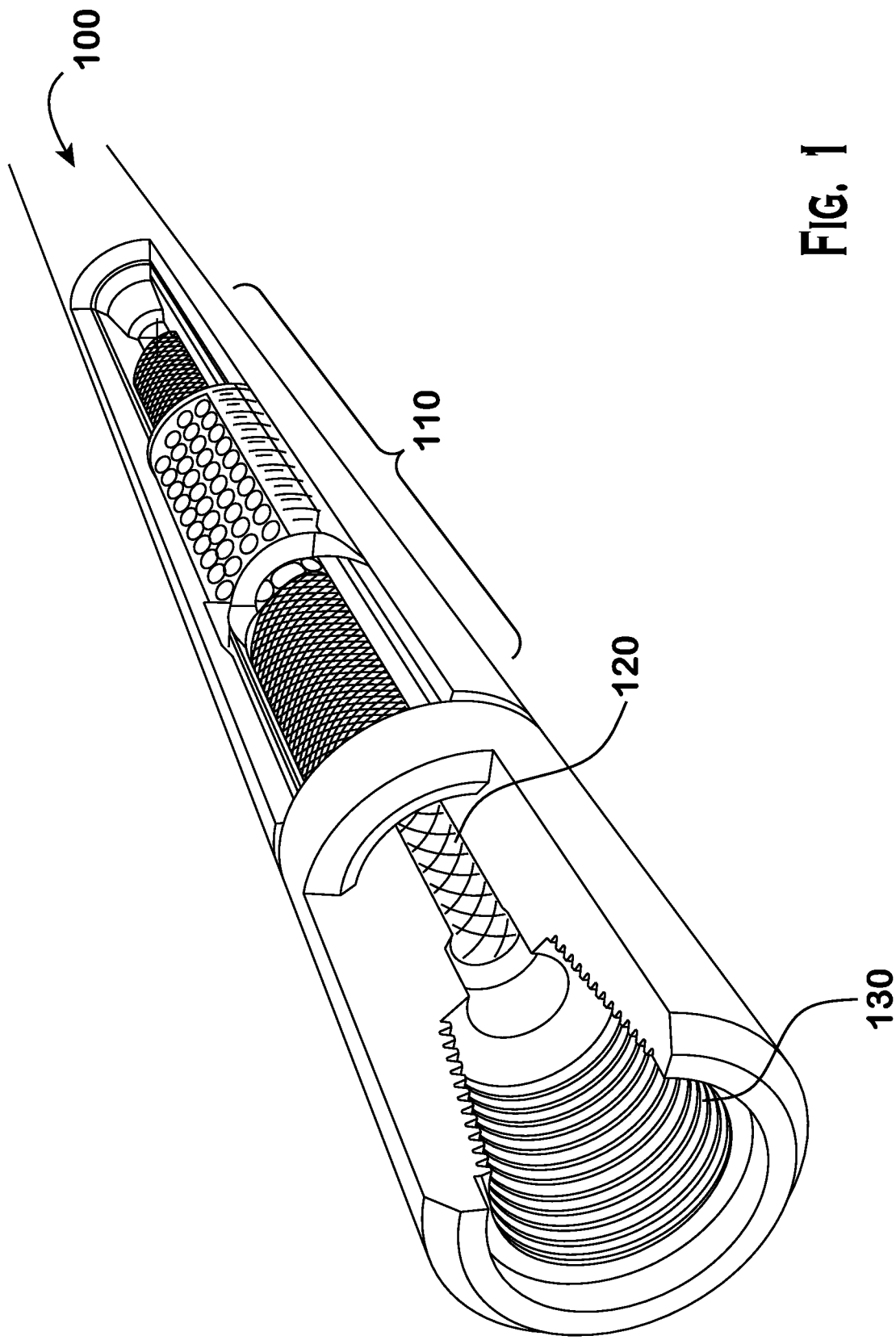
FIG. 1 shows a schematic of an example mud lubricated drilling equipment.

FIG. 1 shows a schematic of an example mud lubricated drilling equipment 100. The mud lubricated drilling equipment comprises at least one bearing 110 and a drill 130. The drill bit (not explicitly shown in FIG. 1) attaches to the drill 130 via the threads (shown).

The bearing 110 can be a radial or thrust (shown) bearing. In some mud lubricated drilling equipment, multiple bearing layers are possible (i.e. 2, 3, 5, 10 or more bearing layers). At least ten bearing layers are explicitly shown in FIG. 1. These bearings 110 are exposed to, and lubricated by, the drilling fluid 120 while the drilling equipment 100 is in operation.

The drilling fluid 120 is a mixture of chemicals and water. The chemicals of the drilling fluid 120 may include solid content (forming the "mud" lubrication). Drilling fluid 120 is pumped from the drill rig surface down into the drill 130. In mud lubricated machines, this drilling fluid 120 can pass through the bearing(s) 110, lubricating them as the machine operates. The drilling fluid 120 may contain various chemicals which may be corrosive to the steel substrate of the bearings, thus impacting bearing service life. Similarly, the solid content in the drilling fluid 120 may act as abrasives to the steel substrate of the bearings 110, also impacting bearing service life. A coating that provides resistance to these corrosive and abrasive factors may thus increase bearing service life.

Figure 2:
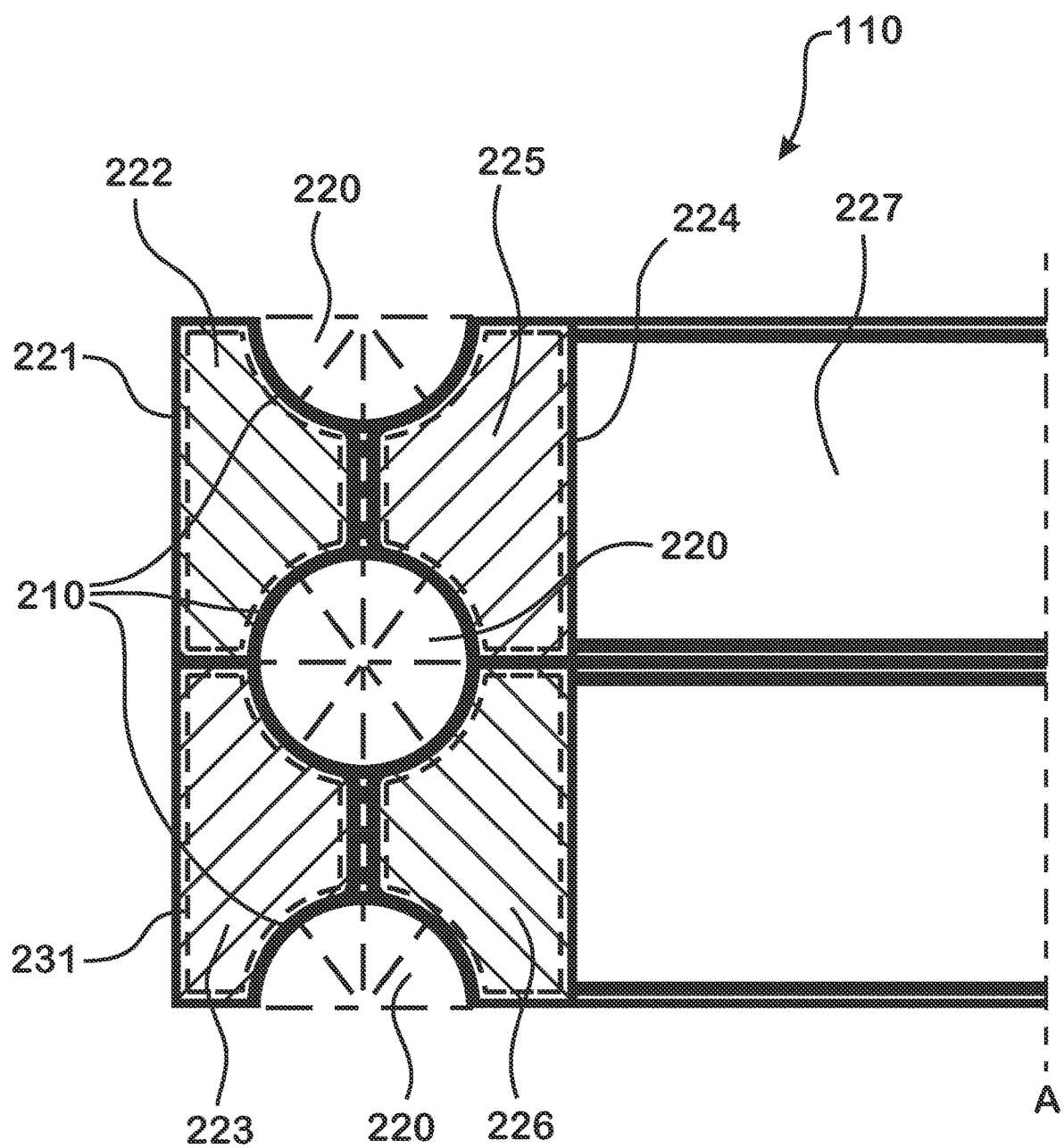
FIG. 2 shows a schematic cross-section of an example bearing.

FIG. 2 shows a schematic cross-section of an example bearing 110 as used in mud lubricated drilling equipment 100. The bearing 110 comprises raceways 210 and a plurality of roller elements 220. The axial direction, A, is shown by the dashed line.

In the example of FIG. 2, three stacked layers of roller elements 220 are shown, but any number of layers may be possible (a single layer stack, 3 layer stack, 10 layer stack, etc.) An outer raceway 221 may be seen comprising a first outer raceway segment 222 and a second outer raceway segment 223. An inner raceway 224 may also be seen comprising a first inner raceway segment 225 and a second inner raceway segment 226. A space 227 inside the stacked layers of rolling elements 220 and bearing raceways 221,224 may also be seen. The space 227 may contain, for example, drilling equipment 100. The roller elements 220 may be any kind of roller element, such as ball or cylindrical rollers. The raceways 210 and/or the plurality of roller elements 220 may be made of any material to which a tungsten carbide coating may be applied, such as steel or a steel substrate. The bearing may be a four point angular contact ball bearing (ACBB) made of a steel substrate.

Applicants respectfully submit that no new matter is added to the application by the amendments to the specification. Applicants respectfully request that the Examiner approve the substitute specification.

The good wear resistance of bearing steels come from the free carbides in the structure, but, being a ferritic material, it has its natural limits with respect to hardness. In the case of mud lubricated drilling equipment, this is particularly relevant because the solid content of the mud which is used as part of the lubricant on the steel bearings can scratch and erode the surface of the steel bearing. A tungsten carbide coating 231 can be applied on a steel substrate 230 to improve hardness and corrosion resistance.

Tungsten carbide (chemical name: WC) is very hard, providing improved abrasion resistance. The hardness of tungsten carbide grades may be controlled by a variety of parameters, such as by controlling the grain size and binder content. Nano-structured tungsten carbide may be produced by reducing the grain size to Nanometer scales (average grain size <100 nm). The hardness of the materials made from Nano-sized powders are significantly higher than those made using larger grain sizes. Thus, a Nano-structured tungsten carbide layer may provide improved hardness and excellent toughness as compared to tungsten carbide created from larger grains. The improved toughness and durability make the coating less susceptible to cracking and chipping.

The resulting hardness may be tested by any well-known hardness test (for example, Vickers, Rockwell, or Brinell). On the Vickers scale, the hardness of the tungsten carbide grade used may be greater than 400 Hv (or greater than 1000 Hv or greater than 2000 Hv). For example, the tungsten carbide grade used may have a hardness of 1400 Hv on the Vickers scale.

Tungsten carbide can be applied as a coating which forms a pore-free surface that also provides corrosion resistance. An unpolished tungsten carbide coating may have a surface roughness of approximately 0.6 µm, which can be further polished to less than 0.1 µm (for example, to 0.02 µm), providing a smooth (non-abrasive) surface for the rolling contact of the roller elements along the raceways. The coating may have a thickness between 5 µm to 300 µm. For example, the tungsten carbide coating may have a thickness of 50 µm.

By placing a tungsten carbide coating over the steel substrate, the hardness and resistance of the steel bearing elements can be improved, thus reducing the abrasion and corrosion damage that may result which in turn leads to a longer service life. The increased toughness and durability make the bearing less susceptible to cracking or chipping. The amount of tungsten carbide needed to coat steel elements is substantially less than the amount needed to make the elements entirely of tungsten carbide, thus reducing costs.

The tungsten carbide coating 231 is shown by the dashed line in FIG. 2. Although only the raceways 210 are shown as being coated in FIG. 2, it should be appreciated that the coating may be applied to any combination of raceways 210 and/or plurality of rolling elements 220 (and/or other regions of the bearing or bearing assembly).

Figure 3:
FIG. 3 shows a flowchart of a method for coating a bearing.

FIG. 3 shows a flowchart of a method 300 for coating a bearing 110. The method 300 comprises 310 coating at least one raceway or a plurality of roller elements with a tungsten carbide coating. The tungsten carbide coating may be a Nano-structured tungsten carbide coating. The coating may be applied by any applicable method, such as by chemical vapor deposition (CVD).

Typically, applying a tungsten carbide coating by CVD involves temperatures in the range of 450-500° C. In this respect, the steel substrate must be chosen such that it has a sufficiently high operating temperature so as to withstand the CVD process. The operating temperature of a material is the temperature range at which the material continues to exhibit its typical properties (i.e. strength of the material). Once the operating temperature is surpassed, the properties of the material begin to act differently or the material may fail to serve its intended purpose. For example, if the operating temperature of the steel is too low, then the heat incurred during the CVD process may deform or otherwise weaken the strength of the steel. Thus, the steel used should have an operating temperature greater than the temperature required for CVD (greater than 450° C. or 500° C.) so as to ensure the stability of the steel du-ing and after the application of the tungsten carbide coating. If a coating process other than CVD is used, then care must be taken to choose a steel substrate with appropriate properties (i.e. operating temperature) to withstand the process used. The steel may have an operating temperature of 500° C. By using this method, complex shapes and non-line-of-sight areas may be coated uniformly.

The tungsten carbide coating results in a combination of increased wear resistance, higher hardness, excellent toughness and impact resistance on the bearing raceway and roller elements which enable significant improvements in bearing life due to reduced wear on the surface. The result will be increased exploitation of the whole drilling equipment, reduced stops for drilling motor bearing changes and reduced spare part costs.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A bearing, comprising:
   the bearing being configured as a thrust bearing and being configured for use in mud lubricated drilling equipment;
   an outer raceway comprising first and second outer raceway segments, wherein each of the first and second outer raceway segments has two outer raceways configured to contact two separate rows of rolling elements;
   an inner raceway comprising first and second inner raceway segments, wherein each of the first and second inner raceway segments has two inner raceways configured to contact two separate rows of rolling elements;
   a first row of rolling elements comprises a plurality of rolling elements disposed between the outer raceway and the inner raceway such that each of the plurality of rolling elements therein contacts each of the first and second outer raceway segments and each of the first and second inner raceway segments; and
   wherein the outer raceway and the inner raceway each comprises a steel substrate covered with a tungsten carbide coating wherein the tungsten carbide coating has a thickness between five micrometers (5 µm) to three hundred micrometers (300 µm).

2. The bearing of claim 1, wherein the tungsten carbide coating is a Nano-structured tungsten carbide coating.

3. The bearing of claim 1, wherein the steel substrate has an operating temperature above 450° C.

4. The bearing of claim 1, wherein the hardness of the tungsten carbide coated surfaces is greater than 2000 Hv.

5. The bearing of claim 1, wherein the hardness of the tungsten carbide coated surfaces is greater than 400 Hv.

6. The bearing of claim 1, wherein the tungsten carbide coating provides resistance to corrosive and abrasive factors and to increase a service life of the bearing.

7. A mud lubricated drilling equipment, comprising:
   a drill having the bearing of claim 1 incorporated therewith.

8. A method to produce the bearing of claim 1, the method comprising coating the outer raceway and the inner raceway with the tungsten carbide by applying the tungsten carbide using chemical vapor deposition.

9. The method of claim 8, wherein the tungsten carbide coating is a Nano-structured tungsten carbide coating.

10. The method of claim 8, wherein the hardness of the tungsten carbide coated surfaces is greater than 2000 Hv.

11. The bearing of claim 8, wherein the hardness of the tungsten carbide coated surfaces is greater than 400 Hv.

* * * * *